United States Patent Office 3,371,097
Patented Feb. 27, 1968

3,371,097
N-AMINOIMIDES OF HALO-SUBSTITUTED POLY-
HYDROMETHANONAPHTHALENEDICARBOX-
YLIC ACIDS
Henryk A. Cyba, Evanston, Ill., assignor to Universal Oil
Products Company, Des Plaines, Ill., a corporation of
Delaware
No Drawing. Continuation-in-part of application Ser. No.
421,665, Dec. 28, 1964. This application Sept. 28, 1966,
Ser. No. 582,543
11 Claims. (Cl. 260—326)

ABSTRACT OF THE DISCLOSURE

N-aminoimides of a chloro- or bromo-substituted polyhydromethanonaphthalenedicarboxylic acid, exemplified by N-phenyl-aminoimide of 5,6,7,8,9,9-hexachloro-1,2,3, 4,4a,5,8,8a - octahydro - 5, 8 - methano-2, 3-naphthalenedicarboxylic acid. The compounds are useful as shrink-proofing agents for fibrous materials such as wool, also as flame retardants for epoxy resins.

This application is a continuation-in-part of my copending application Ser. No. 421,665, filed Dec. 28, 1964, now abandoned. This invention relates to novel compositions of matter comprising N-aminoimides of certain polycyclic acids and more particularly to novel compositions of matter comprising N-aminoimides of halo-substituted polyhydromethanonaphthalenedicarboxylic acids.

Certain novel compositions of matter comprising N-aminoimides of halo-substituted polyhydromethanonaphthalenedicarboxylic acids which are prepared according to the process hereinafter set forth in greater detail will find a wide variety of uses in the chemical field. For example, an N-aminoimide of a halo-substituted polyhydromethanonaphthalenedicarboxylic acid may be used as one of the materials in an interfacial polymerization process which is useful in imparting shrink-proofing properties to fibrous materials and particularly to wool. The interfacial polymerization process is effected by treating the fibrous material with an N-aminoimide of a polyhydromethanonaphthalenedicarboxylic acid and thereafter by treating the fibrous material with a polyacid polyhalide containing at least two acid halide groups per molecule, both the N-aminoimide and polyacid polyhalide being in solutions which are mutually immiscible with one another. The formation of the polymer on the fibrous material, and particularly wool, will impart a shrink-proofing property on the material as well as any other desirable physical characteristics, including smoothness after drying, excellent hand, increased break strength and tear strength as well as improved resistance to abrasion, chemicals and pilling. The use of the aminoimides of the present invention as one of the reactants in forming the polymer is advantageous inasmuch as the fibrous material, and particularly wool, after treatment thereof will not have the desirable characteristics of the fibrous material altered nor will a post-cure of the material be necessary.

It has also been discovered that the products of the present invention which comprise N-aminoimides of polyhalopolyhydromethanonaphthalenedicarboxylic acids are particularly useful as additives to certain polymeric compositions of matter and particularly resins. The N-aminoimides of the present invention when added to these resins, and specifically resins which are referred to as epoxy resins, will act as curing agents therefor and impart useful properties to the cured resins. For example, an epoxy resin which has been cured by the addition of an N-aminoimide prepared according to the process hereinafter described in greater detail will be fire resistant or retardant, the resin being self-extinguishing when removed from the direct action of a flame. This property being fire resistant will be especially useful when preparing articles of commerce which are to be used in places which may be subject to excessive heat or the action of a flame.

In addition, another use to which the N-aminoimides of the halo-substituted polyhydromethanonaphthalenedicarboxylic acids may be put include their use as extreme pressure additives for greases and lubricants, preparation of insecticides which are useful against houseflies, red spiders, aphids and scale insects.

It is therefore an object of this invention to provide novel compositions of matter which will find a wide variety of use in the chemical industry.

A further object of this invention is to provide novel compositions of matter comprising certain N-aminoimides of halo-substituted polyhydromethanonaphthalenedicarboxylic acids.

In a broad aspect, an embodiment of this invention is found in an N-aminoimide of a chloro- or bromo-substituted polyhydromethanonaphthalenedicarboxylic acid.

A further embodiment of this invention is found in an N-arylaminoimide of a chloro- or bromo-substituted polyhydromethanonaphthalenedicarboxylic acid.

A specific embodiment of this invention is found in the N,N-diphenylaminoimide of 5,6,7,8,9,9-hexachloro-1,2,3,4,4a,5,8,8a-octahydro - 5,8 - methano - 2,3-naphthalenedicarboxylic acid.

Other objects and embodiments will be found in the following further detailed description of this invention.

As hereinbefore set forth, the present invention is concerned with novel compositions of matter comprising N-aminoimides of halo-substituted polyhydromethanonaphthalenedicarboxylic acids. These compounds may be prepared in a manner hereinafter set forth in greater detail by condensing a compound selected from the group consisting of halo-substituted polyhydromethanonaphthalenedicarboxylic acids and anhydrides thereof with a hydrazine at condensation conditions and in the presence of a substantially inert organic solvent to prepare the desired N-aminoimides. For purposes of this invention, the term "N-aminoimide" as used in the present specification and appended claims will refer to unsubstituted N-aminoimides and substituted N-aminoimides in which the nitrogen atom may contain substituents of a type also hereinafter set forth in greater detail.

The halo-substituted polyhydromethanonaphthalenedicarboxylic acid or anhydride thereof which comprises one of the starting materials utilized in the process of the present invention may be prepared in any suitable manner such as the Diels-Alder reaction of a conjugated aliphatic diene with an olefinic dicarboxylic acid or anhydride thereof. Examples of conjugated aliphatic dienes which may be used include 1,3-butadiene, 2-methyl-1,3-pentadiene, 1,3-pentadiene, etc.; olefinic dicarboxylic acids or anhydrides which may be used include maleic anhydride, methyl maleic anhydride, fumaric acid, maleic acid, itaconic acid, etc. The Diels-Alder condensation will take place at an elevated temperature in the range of from about 80° to about 250° C. or more and at a pressure sufficient to maintain a major portion of the reactants in a liquid phase, said pressure being in a range of from about atmospheric to about 100 atmospheres or more. The tetrahydrophthalic acid or anhydride thereof which results from the aforementioned condensation is then further condensed with a conjugated halo-substituted cycloalkadiene to form the desired product, examples of said halo-substituted cycloalkadienes include tetrachlorocyclopentadiene, hexachlorocyclopentadiene, tetrabromocyclopentadiene, hexabromocyclopentadiene, etc. The second condensation reaction is also effected at elevated temperatures in the range of from about 50° to about 250° C., or more and at pressures ranging from atmospheric up to about 100 atmospheres or more, the pressure again being sufficient so as to maintain a major portion of the reactants in the liquid phase at the reaction temperature. Examples of halo-substituted polyhydromethanonaphthalenedicarboxylic acid or anhydrides thereof which may be utilized as a starting material in the present process include 5,6,7,8,9,9-hexachloro-1,2,3,4,4a,5,8,8a-octahydro-5,8-methano-2,3-naphthalenedicarboxylic acid,
5,6,7,8,9,9-hexachloro-1,2,3,4,4a,5,8,8a-octahydro-5,8-methano-2,3-naphthalenedicarboxylic acid anhydride,
5,6,7,8,9,9-hexabromo-1,2,3,4,4a,5,8,8a-octahydro-5,8-methano-2,3-naphthalenedicarboxylic acid anhydride,
5,6,7,8-tetrachloro-1,2,3,4,4a,5,8,8a-octahydro-5,8-methano-2,3-naphthalenedicarboxylic acid,
5,6,7,8-tetrachloro-1,2,3,4,4a,5,8,8a-octahydro-5,8-methano-2,3-naphthalenedicarboxylic acid anhydride,
5,6,7,8-tetrabromo-1,2,3,4,4a,5,8,8a-octahydro-5,8-methano-2,3-naphthalenedicarboxylic acid anhydride.

These compounds so listed are only representative of the class of compounds which may be prepared, and the present invention is not necessarily limited thereto.

It is to be understood that the term "halo-substituted polyhydromethanonaphthalenedicarboxylic acid or anhydride thereof," as utilized in the present specification and appended claims will refer to acids or anhydrides which may contain mono-, or polyhalo substitution. For purposes of brevity, the examples of compounds utilized in this process are listed as containing more than one chlorine or bromine substituent, although the actual number of halo substituents may range from 1 up to about 8 or more.

The hydrazines which are condensed with the aforementioned halo-substituted polyhydromethanonaphthalenedicarboxylic acid anhydrides possess the generic formula:

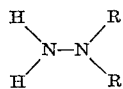

in which R is selected from the group consisting of hydrogen, alkyl, cycloalkyl, aryl, alkaryl and aralkyl radicals. It is to be noted that the hydrazine may be mono- or di-substituted with the limitation being that one nitrogen atom must not contain a substituent other than two hydrogen atoms thereon. Examples of hydrazines which may be utilized include hydrazine, alkyl-substituted hydrazines such as methylhydrazine, ethylhydrazine, propylhydrazine, isopropylhydrazine, N',N'-dimethylhydrazine, N',N'-diethylhydrazine, N',N'-dipropylhydrazine, mixed alkyl aryl hydrazines such as N'-methyl-N'-phenylhydrazine, N'-ethyl-N'-phenylhydrazine, N'-isoamyl-N'-phenyl, N'-isobutyl-N'-phenyl, N'-methyl-N'-tolyl, N'-ethyl-N'-tolyl, N'-methyl-N'-benzylhydrazine, etc.; cycloalkyl-substituted hydrazines such as cyclopentylhydrazine, cyclohexylhydrazine, cycloheptylhydrazine, N',N'-dicyclopentylhydrazine, N',N'-dicyclohexylhydrazine, N',N'-dicycloheptylhydrazine, etc.; aryl-substituted hydrazines such as phenylhydrazine, N',N'-diphenylhydrazine, etc.; alkaryl-substituted hydrazines such as p-tolylhydrazine, N',N'-di-(p-tolyl)hydrazine, p-ethylphenylhydrazine, N',N'-di-(p-ethylphenyl)hydrazine, etc.; aralkyl-substituted hydrazines such as benzylhydrazine, N',N'-di-benzylhydrazine, etc. It is to be understood that the aforementioned hydrazines and substituted hydrazines in which the substituents are on only one of the nitrogen atoms are only representative of the class of compounds which may be used, and that the present invention is not necessarily limited thereto. It is also understood that the alkyl, cycloalkyl or aryl substituents may contain additional halogens, alkoxy, amino, alkylamino, hydroxyl, carbonyl or ester, etc., groups.

The reaction between the halo-substituted polyhydromethanonaphthalenedicarboxylic acid anhydride and the particular hydrazine is effected at elevated temperatures ranging from about 80° up to about 200° C. or more, the particular reaction temperature being dependent upon the nature of the substantially inert organic solvent in which the reaction is effected and the particular hydrazone used as a co-reactant. Thus with N'-ethyl-N'-phenylhydrazine, N'-isoamyl-N'-phenylhydrazine, N'-isobutyl-N'-phenylhydrazine, N'-methyl-N'-phenylhydrazine, N',N'-diphenylhydrazine, etc., the reaction is effected in the presence of relatively high boiling solvents such as benzene, toluene, xylene, ethylbenzene, cumene, etc., in the temperature range of from about 80° to about 170° C. Examples of substantially inert organic solvents which may be used include paraffinic hydrocarbons such as n-pentane, n-hexane, n-heptane, etc.; cycloparaffinic hydrocarbons such as cyclopentane, cyclohexane, methylcyclopentane, etc.; aromatic hydrocarbons such as benzene, toluene, benzelenes, ethylbenzenes, etc. When low boiling substituted hydrazines constitute one of the reactants in the present process, it is preferable to use solvents in which both reactants are soluble. Examples of these solvents include acetic acid, dimethyl ether, diethyl ether, dipropyl ether, dioxane, pyridine, alkyl pyridines, tetrahydrofurane, ethylene glycol ethers, polyethylene glycol polyethers, etc. In addition, any non-reactive solvent which is inert to the acid or anhydride and the hydrazines, or combination of solvents may be utilized. Furthermore, it is contemplated within the scope of this invention that catalysts, either acidic or basic in nature, which are known in the art to promote amidation or dehydration reactions such as phosphorus trichloride, thionyl chloride, tributylamine, etc., may be used. The reaction will proceed for a period of time sufficient to azeotrope off the water which has been formed by the reaction. Therefore, the reaction time will, of necessity, be dependent to some extent upon the particular temperature which is employed (usually the reflux temperature of the solvent) and will range from about 0.5 up to about 5 hours or more.

The process of the present invention which is utilized to prepare the novel compositions of matter comprising N-aminoamides of halo-substituted polyhydromethanonaphthalenediacarboxylic acids may be effected in any suitable maner and may comprise either a batch or continuous type operation. When a batch type operation is used, a hydrazine of the type hereinbefore set forth in greater detail is placed in an appropriate reaction vessel along with a substantially inert organic solvent. The halo-substituted polyhydromethanonaphthalenedicarboxylic acid or anhydride thereof is slowly added thereto, the reaction usually being exothermic. To control this exothermicity, the hydrazine may be cooled prior to the addition of the acid or anhydride and the resulting rise in temperature controlled by utilization of any external cooling means such as an icebath. Upon completion of the addition of the acid or anhydride, the reaction mixture is heated to the reflux temperature of the solvent. The reaction vessel which is utilized for the process of the present invention, is provided with means such as a water trap for removing the water which is formed during the reaction. Upon completion of the desired residence time, which may, as hereinbefore set forth range from about 0.5 up to 5 hours or more, as evidenced by the removal and recovery of the theoretical amount of water, the reaction mixture is allowed to cool to room temperature. Following this, the solvent may be removed by distillation on a steambath or other similar apparatus, after which the excess hydrazine compound, if any, is also removed, usually by fractional distillation. In this respect, it should be noted that the hydrazine or the substituted hydrazines are actually present in the original reaction mixture in a ratio of from about 1.0 to about 2 moles of hydrazine per mole of anhydride. The reaction product is recovered from the distillation and purified by conventional means such as washing with water, dissolving in alcohol and drying.

It is also contemplated within the scope of this invention that the N-aminoimides of halo-substituted polyhydromethanonaphthalenedicarboxylic acids may be prepared in a continuous manner of operation, although not necessarily with equivalent results. When such a method is used, a quantity of the starting materials comprising the halo-substituted polyhydromethanonaphthalenedicarboxylic acid or anhydride thereof and the hydrazine compound, along with a substantially inert organic solvent, are continually charged to a reaction vessel which is maintained at the proper operation conditions of temperature and pressure. Due to the exothermicity of the reaction, the reactants are charged to the reactor through separate lines. Upon completion of the desired residence time in the reaction vessel the reactor effluent is continually removed, the unreacted starting materials are separated from the effluent by conventional means and recycled to form a portion of the feed stock, while the remainder of the effluent is further subjected to fractional distillation to remove the solvent (the water which is formed having previously been azeotroped off while the reaction mixture was still in the reaction vessel) and thereafter purified and recovered by conventional means.

The novel compositions of matter of the present invention comprising N-aminoimides, N-alkylaminoimides, N-arylaminoimides, N-alkylarylaminoimides, N-aralkylaminoimides, N-alkarylaminoimides and N-cycloalkylaminoimides of halo-substituted polyhydromethanonaphthalenedicarboxylic acids will possess the generic formula:

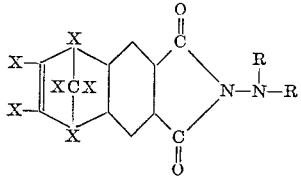

in which X is selected from the group consisting of hydrogen and halogen, and particularly chlorine and/or bromine, at least two of the X's being halogen and R is selected from the group consisting of hydrogen, alkyl, aryl, alkaryl, aralkyl and cycloalkyl radicals. Some specific examples of N-aminoimides of halo-substituted polyhydromethanonaphthalenedicarboxylic acids which may be prepared include the N-methylaminoimide of 5,6,7,8,9,9-hexachloro-1,2,3,4,4a,5,8a-octahydro-5,8-methano-2,3-naphthalenedicarboxylic acid,
the N-ethylaminoimide of 5,6,7,8,9,9-hexachloro-1,2,3,4,4a,5,8,8a-octahydro-5,8-methano-2,3-naphthalenedicarboxylic acid,
the N-propylaminoimide of 5,6,7,8,9,9-hexachloro-1,2,3,4,4a,5,8,8a-octahydro-5,8-methano-2,3-naphthalenedicarboxylic acid,
the N-dimethylaminoimide of 5,6,7,8,9,9-hexachloro-1,2,3,4,4a,5,8,8a-octahydro-5,8-methano-2,3-naphthalenedicarboxylic acid,
the N-diethylaminoimide of 5,6,7,8,9,9-hexachloro-1,2,3,4,4a,5,8,8a-octahydro-5,8-methano-2,3-naphthalenedicarboxylic acid,
the N-phenylaminoimide of 5,6,7,8,9,9-hexachloro-1,2,3,4,4a,5,8,8a-octahydro-5,8-methano-2,3-naphthalenedicarboxylic acid,
the N-diphenylaminoimide of 5,6,7,8,9,9-hexachloro-1,2,3,4,4a,5,8,8a-octahydro-5,8-methano-2,3-naphthalenedicarboxylic acid,
the N-phenylaminoimide of 5,6,7,8,9,9-hexabromo-1,2,3,4,4a,5,8,8a-octahydro-5,8-methano-2,3-naphthalenedicarboxylic acid,
the N-methylaminoimide of 5,6,7,8,9,9-hexabromo-1,2,3,4,4a,5,8,8a-octahydro-5,8-methano-2,3-naphthalenedicarboxylic acid,
the N-benzylaminoimide of 5,6,7,8,9,9-hexachloro-1,2,3,4,4a,5,8,8a-octahydro-5,8-methano-2,3-naphthalenedicarboxylic acid,
the N,N-dibenzylaminoimide of 5,6,7,8,9,9-hexachloro-1,2,3,4,4a,5,8,8a-octahydro-5,8-methano-2,3-naphthalenedicarboxylic acid,
the N-p-tolylaminoimide of 5,6,7,8,9,9-hexachloro-1,2,3,4,4a,5,8,8a-octahydro-5,8-methano-2,3-naphthalenedicarboxylic acid,
the N,N-di(p-tolyl)aminoimide of 5,6,7,8,9,9-hexachloro-1,2,3,4,4a,5,8,8a-octahydro-5,8-methano-2,3-naphthalenedicarboxylic acid,
N-cyclohexylaminoimide of 5,6,7,8,9,9-hexachloro-1,2,3,4,4a,5,8,8a-octahydro-5,8-methano-2,3-naphthalenedicarboxylic acid,
the N,N-cyclohexylaminoimide of 5,6,7,8,9,9-hexachloro-1,2,3,4,4a,5,8,8a-octahydro-5,8-methano-2,3-naphthalenedicarboxylic acid, etc.

It is to be understood that the aforementioned N-aminoimides of the halo-substituted polyhydromethanonaphthalenedicarboxylic acids are only representatives of the class of novel compositions of matter and that the present invention is not necessarily limited thereto.

As a specific example of one of the uses to which an N-aminoimide of a halo-substituted polyhydromethanonaphthalenedicarboxylic acid may be put, the following will describe the use as additives for certain polymeric compositions of matter and particularly resinous material. Particularly speaking, the N - aminoimides of the halo-substituted polyhydromethanonaphthalenedicarboxylic acids which are prepared according to the process of this invention may be used as additives with epoxy resins whereby the final product will posses advantageous physical properties, one of which is a high degree of flame retardancy. The epoxy resins in an uncured state are usually thermoplastic and may range from low viscosity liquids to high melting point, brittle solids. One example of an epoxy resin which may be cured by the addition of the N-aminoimides of the present invention is the condensation product of epichlorhydrin and bisphenol-A. The resins may be cured by admixing an imide of an acid of the type hereinbefore set forth with the resin and thereafter curing the mixture by treatment at an elevated temperature for a predetermined period of time. The resultant product will have the physical characteristics thereof altered to their desirable values and thus may be utilized for various purposes such as floor surfacing, coatings, etc. Among these desirable characteristics is the excellent fire retardance as well as the color stability of the finished product.

The following examples are given to illustrate the process of the present invention which, however, are not intended to limit the generally broad scope of the present invention with strict accordance therewith.

EXAMPLE I

One method of preparing the compounds according to the process of the present invention is to place 91.5 g. (0.75 mole) of N'-methyl-N'-phenylhydrazine in a reaction vessel provided with a water trap. During a period of about 1 hour, 213 g. (0.5 mole) of 5,6,7,8,9,9-hexachloro-1,2,3,4,4a,5,8,8a - octahydro - 5,8 - methano - 2,3 - naphthalenedicarboxylic acid anhydride is gradually added thereto. Following this, the mixture is agitated and heated to about 100° C., 200 cc. of xylene is added, the reaction mixture is heated and maintained at reflux temperature (135–140° C.) for a period of about 1.5 hours. During this time, the water which is formed is azeotroped off during the refluxing. The xylene is then gradually distilled off while the temperature is being raised to 160–170° C. The residual xylene and the excess N'-methyl-N'-phenylhydrazine are then removed by distillation under a high vacuum. After removal of the solvent and excess hydrazine, the solid which remains is ground to a fine powder, washed several times with water, dissolved in methyl alcohol and dried using anhydrous sodium sulphate. The mixture is then filtered and the methyl alcohol is evaporated, thereby leaving the desired product which comprises the N-methyl-N-phenylaminoimide of 5,6,7,8,9,9 - hexachloro - 1,2,3,4,4a,5,8,8a-octahydro-5,8-methano-2,3-naphthalenedicarboxylic acid.

EXAMPLE II

In an alternate method 54 g. of phenylhydrazine (0.5 mole) is dissolved in 100 g. of glacial acetic acid. This is then added to a solution of 213 g. (0.5 mole) of 5,6,7,8,9,9 - hexachloro - 1,2,3,4,4a,5,8,8a - octahydro-5,8-methano-2,3-naphthalenedicarboxylic acid in acetic acid. The solution is refluxed and mixed for about 2 hours. Thereafter, the product is precipitated with water, filtered off, dissolved in ether, dried with anhydrous sodium sulphate, filtered and the ether and acetic acid are distilled off, the desired product comprising the N-phenylaminoimide of 5,6,7,8,9,9 - hexachloro - 1,2,3,4,4a,5,8,8a-octahydro-5,8-methano-2,3-naphthalenedicarboxylic acid being recovered.

EXAMPLE III

To illustrate another method of obtaining the desired product of the present invention, 108 g. (2.0 mole) of methylhydrazine is charged to a reaction flask provided with stirring and heating means, as well as a Dean-Stock adapter. The flask is imersed in an ice bath until the temperature of the methylhydrazine is lowered to about 3° C. Following this, 85 g. (0.2 mole) of 5,6,7,8,9,9-hexachloro - 1,2,3,4,4a,5,8,8a - octahydro - 5,8-methano-2,3-naphthalenedicarboxylic acid anhydride is slowly added during a period of 15 minutes. The immediate reaction upon the addition of the anhydride will be exothermic with the well temperature reaching about 15° C. during the addition. The reaction mixture is then allowed to warm to room temperature and 200 cc. of ethyl ether is added. The compounds are refluxed with the ethyl ether for 1 hour, then the ether is replaced by 100 g. of benzene and the reaction mixture refluxed for 2 hours. Finally, the benzene is replaced by xylene, the reaction mixture is then heated to reflux and maintained thereat for a period of about 3 hours. The reaction is considered complete when the theoretical amount of water is collected in the adapter. Following this, the solution is allowed to cool to room temperature and treated to a manner similar to that set forth in Example I above, the desired product comprising the N-methylaminoimide of 5,6,7,8,9,9-hexachloro - 1,2,3,4,4a,5,8,8a - octahydro - 5,8 - methano-2,3-naphthalenedicarboxylic acid being recovered.

EXAMPLE IV

In this example, 92 g. (0.5 mole) of N′,N′-diphenylhydrazine and 100 cc. of toluene along with 213 g. (0.5 mole) of 5,6,7,8,9,9 - hexachloro - 1,2,3,4,4a,5,8,8a-octahydro-5,8-methano-2,3-naphthalenedicarboxylic acid anhydride are placed in a reaction flask of a similar nature to those hereinbefore described. The reaction mixture is then heated to reflux temperature (approximately 115–120° C.) and maintained thereat for a period of about 4 hours. During this time, a substantial amount of the theoretical water which is formed is recovered in the adapter. Toluene is then gradualy distilled off and the temperature raised gradually to 160–170° C. The refluxing and mixed mixture is maintained at this temperature for 1 hour. The flask and contents thereof are then allowed to cool to room temperature, the residual toluene and the excess N′,N′-diphenylhydrazine are removed by distillation under reduced pressure. The desired product comprising the N,N-diphenylaminoimide of 5,6,7,8,9,9-hexachloro - 1,2,3,4,4a,5,8,8a - octahydro - 5,8-methano-2,3-naphthalenedicarboxylic acid is recovered by conventional means.

EXAMPLE V

In this example, 17.7 g. (0.2 mole) of N′,N′-diethylhydrazine are placed in a reaction vessel which is thereafter cooled to a temperature of about 3° C., by immersing the flask in an ice bath. To the cooled mixture is added 42.6 g. (0.1 mole) of 5,6,7,8,9,9-hexachloro-1,2,3,4,4a,5,8,8a - octahydro - 5,8 - methano - 2,3 - naphthalenedicarboxylic anhydried during a period of about 15 minutes. The temperature of the flask will rise due to the exothermicity of the reaction and upon completion of the addition of the anhydride, the flask and contents thereof are allowed to warm to room temperature. Following this 100 cc. of toluene are added, the flask and contents thereof are heated to a temperature of about 115° C., and maintained thereat for a period of about 4 hours, the reaction being completed when the theoretical amount of water which is formed during the reaction is recovered in the water trap. At the end of this time, the flask and contents thereof are allowed to cool to room temperature. The solvent is removed by distillation on a steam bath and excess hydrazine removed by distillation under a high vacuum. The desired product comprising the N,N-diethylaminoimide of 5,6,7,8,9,9-hexachloro-1,2,3,4,-4a,5,8,8a - octahydro - 5,8 - methano-2,3-naphthalene-dicarboxylic acid is recovered.

EXAMPLE VI

In this example, 53.4 (0.5 mole) of phenylhydrazine along with 200 cc. of toluene is placed in a reaction flask which is thereafter cooled by means of an ice bath. 175 g. (0.25 mole) of 5,6,7,8,9,9-hexabromo-1,2,3,4,4a,5a,8,8a-octahydro - 5,8-methano-2,3-naphthalenedicarboxylic anhydried is slowly added to the mixture during a period of about 30 minutes. Upon completion of the addition which is accompanied by a rise in temperature due to the exothermic nature of the reaction, the flask and contents thereof are heated to reflux temperature of about 115° C. and maintained thereat for a period of about 4 hours, the theoretical amount of water which is formed during the reaction being collected in a water trap. Upon completion of the reaction, the flask and contents thereof are allowed to cool to room temperature, following which the toluene is removed by distillation as is the excess phenylhydrazine. The desired product comprising the N-phenylaminoimide of 5,6,7,8,9,9-hexabromo-1,2,3,4,4a,5,8,8a-octahydro-5,8-methano-2,3-naphthalenedicarboxylic acid is recovered by conventional means.

EXAMPLE VII

In this example, 192 g. of hydrazine are dissolved in 500 g. of methanol and placed in a three neck two liter flask provided with stirring means and a nitrogen inlet tube. Gradually 425 g. of 5,6,7,8,9,9-hexachloro-1,2,3,4,-4a,5,8,8a - octahydro - 5,8 - methano-2,3-naphthalenedicarboxylic anhydride are added in aliquots, diminishing in size. The temperature is kept below the boiling point of methanol by cooling. At the end of the addition period, the mixture is refluxed for one hour, most of the methanol being distilled off until the contact becomes mushy and difficult to stir. The product is then filtered, suspended in benzene and refluxed until no more evolution of water is evident. The product is filtered again, the mother liquor is evaporated until difficult to stir and treated as above. If desired, the second mother liquor can be treated successively as above until most of the product is filtered off and the remaining liquid consists of methanol and hydrazine. This can be recovered if desired. The above filtered precipitates are washed with water, dried by azeotroping in benzene and finally the benzene is evaporated. The second and third precipitates so obtained are substantially the N-aminoimide of 5,6,7,8,9,9-hexachloro-1,2,3,-4,4a,5,8,8a - octahydro - 5,8 - methano - 2,3-naphthalene-dicarboxylic acid.

I claim as my invention:

1. A compound having the formula:

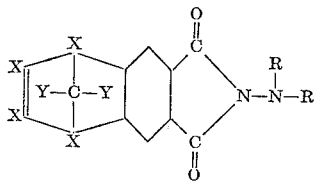

where X is chlorine or bromine; Y is hydrogen, chlorine or bromine; and R is selected from the group consisting of hydrogen, lower alkyl, phenyl, lower alkyl-substituted phenyl, phenyl-substituted lower alkyl, and cycloalkyl containing from 5 to 7 carbon atoms.

2. The compound of claim 1 being N,N-diphenylaminoimide of 5,6,7,8,9,9 - hexachloro - 1,2,3,4,4a,5,8,8a-octahydro-5,8-methano-2,3-naphthalenedicarboxylic acid.

3. The compound of claim 1 being N-phenylaminoimide of 5,6,7,8,9,9 - hexachloro - 1,2,3,4,4a,5,8,8a-octahydro-5,8-methano-2,3-naphthalenedicarboxylic acid.

4. The compound of claim 1 being N-methylaminoimide of 5,6,7,8,9,9 - hexachloro - 1,2,3,4,4a,5,8,8a-octahydro-5,8-methano-2,3-naphthalenedicarboxylic acid.

5. The compound of claim 1 being N,N-diethylaminoimide of 5,6,7,8,9,9 - hexachloro - 1,2,3,4,4a,5,8,8a-octahydro-5,8-methano-2,3-naphthalenedicarboxylic acid.

6. The compound of claim 1 being N-methyl-N-phenyl-aminoimide of 5,6,7,8,9,9 - hexachloro-1,2,3,4,4a,5,8,8a-octahydro-5,8-methano-2,3-naphthalenedicarboxylic acid.

7. The compound of claim 1 wherein at least one R is phenyl.

8. The compound of claim 1 wherein at least one R is lower alkyl.

9. The compound of claim 1 wherein at least one R is lower alkyl-substituted phenyl.

10. The compound of claim 1 wherein at least one R is phenyl-substituted lower alkyl.

11. The compound of claim 1 wherein at least one R is cycloalkyl containing 5 to 7 carbon atoms.

References Cited
UNITED STATES PATENTS

| | | | |
|---|---|---|---|
| 3,305,347 | 2/1967 | Minieri | 71—121 |
| 3,235,595 | 2/1966 | Pawloski | 71—121 XR |
| 3,197,504 | 7/1965 | Harvey | 71—121 XR |
| 3,138,521 | 6/1964 | Jelinek et al. | 71—121 XR |
| 3,084,036 | 4/1963 | Josephs | 71—121 XR |
| 3,075,013 | 1/1963 | Haldeman et al. | 71—121 XR |

ALEX MAZEL, *Primary Examiner.*

J. NARCAVAGE, *Assistant Examiner.*